April 16, 1929. J. P. GERAGHTY 1,709,717
SAFETY DEVICE FOR AUTOMOBILES
Filed April 29, 1924 3 Sheets-Sheet 1
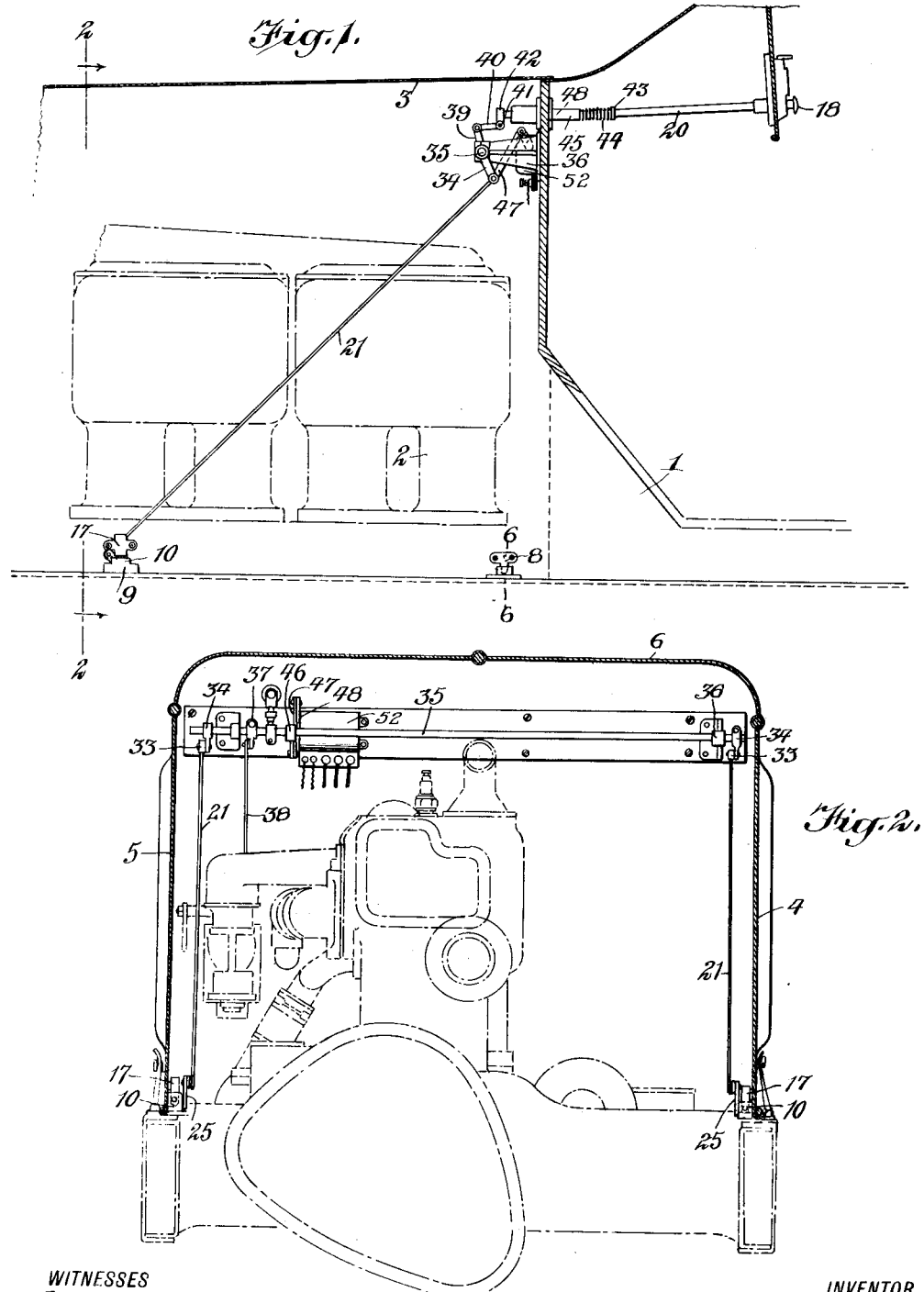
WITNESSES
INVENTOR
John P. Geraghty
BY
ATTORNEYS April 16, 1929.   J. P. GERAGHTY   1,709,717
SAFETY DEVICE FOR AUTOMOBILES
Filed April 29, 1924   3 Sheets-Sheet 2
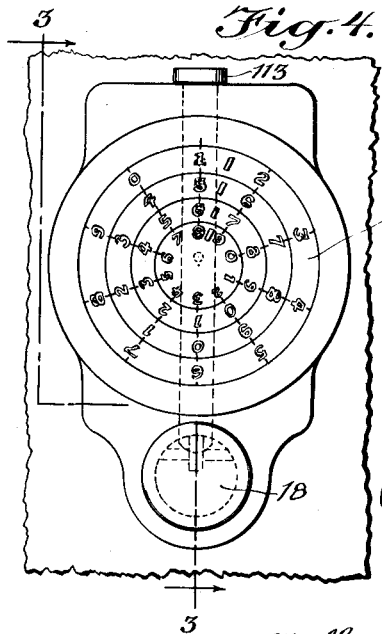
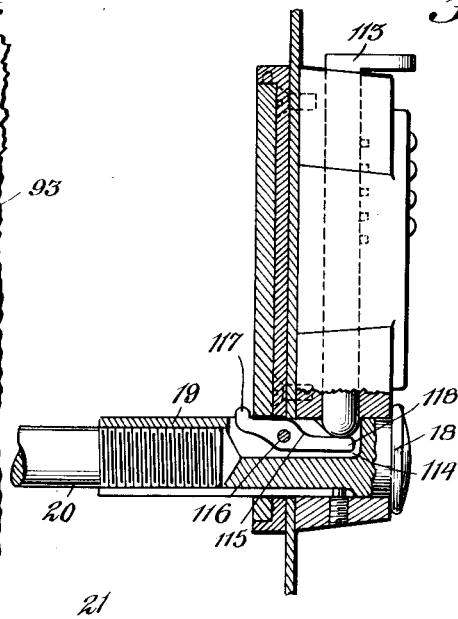
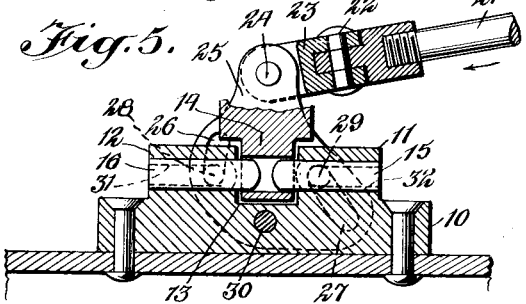
WITNESSES
INVENTOR
John P. Geraghty
BY
ATTORNEYS April 16, 1929.　　J. P. GERAGHTY　　1,709,717
SAFETY DEVICE FOR AUTOMOBILES
Filed April 29, 1924　　3 Sheets-Sheet 3
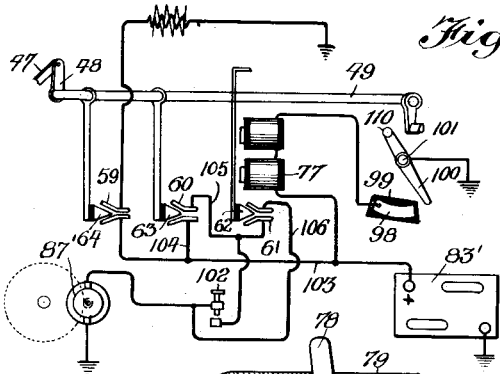
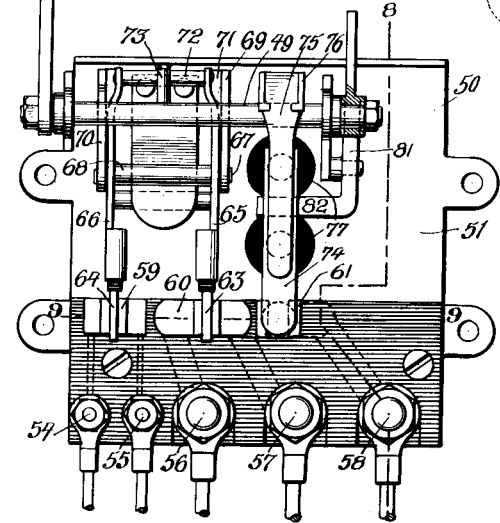
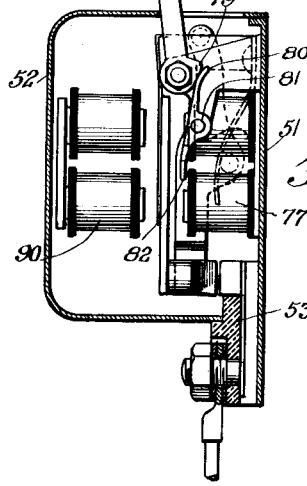
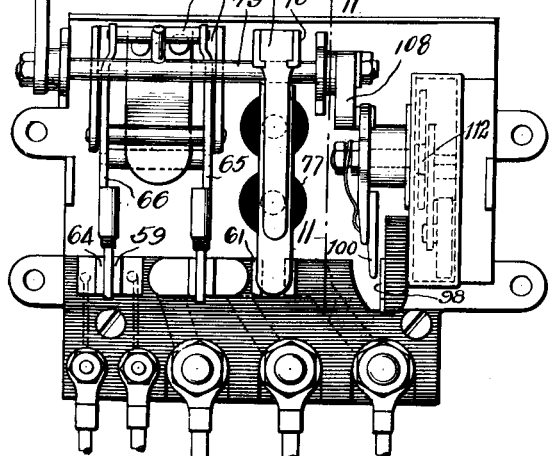
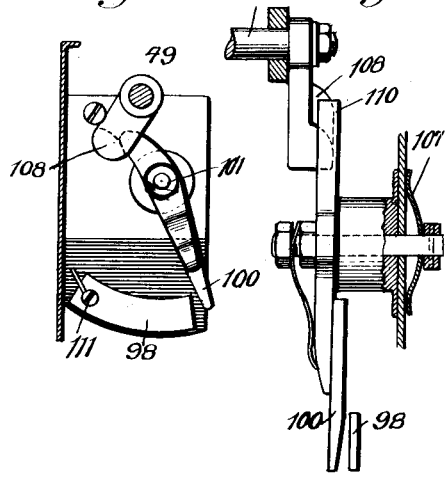
WITNESSES
INVENTOR
John P. Geraghty
BY
ATTORNEYS Patented Apr. 16, 1929.

1,709,717

UNITED STATES PATENT OFFICE.

JOHN P. GERAGHTY, OF JERSEY CITY, NEW JERSEY.

SAFETY DEVICE FOR AUTOMOBILES.

Application filed April 29, 1924. Serial No. 709,840.

This invention relates to an improved safety device for automobiles and has for an object to provide a construction which eliminates the possibility of loss of a key and at the same time prevents the theft of the automobile.

Another object of the invention is to provide an improved locking structure for automobiles which utilizes a combination lock and which necessitates the stopping of the engine before the lock can be actuated and which requires unlocking of the locking mechanism before the engine can be started.

A further object of the invention is to provide a safety locking structure for automobiles wherein the gas and ignition are both turned on and off as the locking mechanism is operated.

A still further object of the invention is to provide an improved construction wherein by a single coacting mechanism the hood of the automobile engine may be locked closed, the spark turned off and the current to the electric starter also turned off.

In the accompanying drawings—

Figure 1 is a fragmentary sectional view through part of an automobile with an embodiment of the invention shown applied thereto, said embodiment being shown in elevation.

Figure 2 is a sectional view through Figure 1, approximately on line 2—2, showing the mechanism embodying the invention in front elevation.

Figure 3 is a sectional view through Figure 4, approximately on line 3—3.

Figure 4 is a front view of a combination lock and certain other parts embodying certain features of the invention.

Figure 5 is a longitudinal vertical sectional view through the hood lock shown in Figure 1.

Figure 6 is an enlarged fragmentary sectional view through Figure 1, approximately on line 6—6.

Figure 7 is a plan view of an ignition and starting switch mechanism embodying certain features of the invention, the protecting housing being removed.

Figure 8 is a sectional view through Figure 7, approximately on line 8—8.

Figure 9 is a transverse sectional view through Figure 7, approximately on line 9—9.

Figure 10 is a view similar to Figure 7 but showing a modified construction.

Figure 11 is a fragmentary sectional view through Figure 10, approximately on line 11—11.

Figure 12 is an enlarged fragmentary edge view partly in section showing more in detail the structure illustrated in Figure 11.

Figure 13 is a diagram showing the wiring for the starter and the ignition.

Figure 14 is a diagram similar to Figure 13 but showing the connection for the modified form of the switch illustrated in Figure 10.

Referring to the accompanying drawings by numerals, 1 indicates an automobile of any desired kind having an engine 2 also of any desired kind. The automobile 1 is provided with a hood 3 for the engine 2, which hood may be of any desired structure, preferably of the usual structure wherein the sides 4 and 5 may be hinged back as well as the top sections 6 and 7. Heretofore, hoods of this kind were held down by spring pressed hooks or catches but in the present invention, each of the side members 4 and 5 is provided with a pin 8 near each end, said pins extending into suitable sockets 9 secured in place in any desired manner, as for instance, by rivets and the pins 8 are also secured by rivets or other suitable means to the hood. This arrangement of pins will prevent any outward bending of the hood at either end while at the center there is provided a locking structure 9 of special construction as shown more particularly in Figure 5. This locking structure includes a base 10 riveted or otherwise secured to the automobile 1, said base having upwardly extending members 11 and 12, said members having an aperture 13 arranged therebetween for receiving the bolt 14, which bolt has a passage or bore therein adapted to receive the respective latch members 15 and 16 which are slidingly mounted in the members 11 and 12. The bolt 14 is provided with an enlargement 17 which is riveted or otherwise rigidly secured to the hood 3 as indicated in Figure 1 and, consequently, is raised and lowered therewith. When the hood is closed, the respective pins 8 are in their sockets and the bolt 14 is in the opening or socket 13.

When the engine 2 is rotating, the latches 15 and 16 are pulled back so that the bolt 14 is merely loosely resting in the socket 13 but when the engine is stopped and the knob 18 is forced inwardly to the position shown in Figure 3, the latches will be moved to the position shown in Figure 5 whereby the hood is locked closed. By moving the knob 18 to the position shown in Figure 3, the same operates the sleeve 19 to which the rod 20 is connected by suitable threads or in some other suitable manner. The rod 20 extends through suitable connecting mechanism hereinafter fully described so that when it is pushed into the position shown in Figure 3, the connecting rod 21 will be moved to the position shown in Figure 5. This rod is pivotally connected at 22 to a coupling 23 which in turn is pivotally connected at 24 to what may be called a cam plate 25. The cam plate 25 is provided with cam slots 26 and 27 into which the pins 28 and 29 extend, said pins being rigidly secured to the latches 15 and 16. Suitable slots 31 and 32 are provided on the interior face of the members 11 and 12 to permit a proper back and forth movement of the latches. It will be noted that the cam plate 25 is pivotally mounted at 30 on the base 10 whereby when the rod 21 is pulled in one direction, the plate will be swung for moving the latches 15 and 16 out of engagement with the bolt 14 and when moved in the opposite direction will act to cause these bolts to move into engagement as shown in Figure 5.

As indicated in Figures 1, 2 and 7, the rod 21 is pivotally connected at 33 to an arm 34. The arm 34 is rigidly secured to a shaft 35 supported by suitable brackets 36. It will be noted from Figure 2 that the rods 21 on opposite sides of the engine are connected in the same manner to shaft 35 so that the locking mechanism 9 on both sides will be simultaneously locked and unlocked as the shaft 35 is rocked. An arm 37 is secured to shaft 35 and is pivotally connected with the link 38 which in turn is connected with part of the carbureter of the engine whereby the fuel is turned on and off as the shaft 35 is rocked. An arm 39 is rigidly secured to shaft 35 and pivotally connected to one end of the link 40 (Figure 1) while the opposite end of said link is pivotally connected at 41 to the fitting 42 secured to the end of the rod 20. This rod is provided with a stop 43 against which the spring 44 presses, said spring also pressing against the guiding sleeve 45 whereby the rod 20 and parts associated therewith are continually given a tendency to move outwardly as shown in Figure 1. An arm 46 is also secured to shaft 35, said arm being pivotally connected at its outer end with the link 47 which in turn is pivotally connected to the outer end of the arm 48, which arm is rigidly secured to the shaft 49, said shaft forming part of the switch mechanism shown in Figure 7.

The various parts just described are so arranged that when the rod 20 and the head 18 are in their outer position as shown in Figure 1, the lugs 8 will be in their unlocked position, the gasoline will be turned on and the ignition circuit will be closed whereby the engine may properly function. As the parts move to this position, the circuit of the starter is closed and is maintained closed for a short time whereby the engine may be properly turned over. The switch mechanism shown in Figure 7 is formed to close the circuit of the ignition system and maintain the same closed when the engine is running and also to temporarily close the circuit of the starter.

As indicated in Figures 7, 8 and 9, the switch 50 is provided with a base plate 51 on which the various parts are mounted and to which a cover 52 may be secured in any desired way. An insulating plate 53 is secured to plate 51 near one edge, said insulating plate carrying the various binding posts 54, 55, 56, 57 and 58, said binding posts being connected to the respective switch sockets 59, 60 and 61. The binding posts 54 and 55 are connected to the opposite parts of the socket 59 while the binding posts 56 and 57 are connected to the opposite parts of the socket 60 and the binding post 58 is connected to one side or part of the socket 61. The opposite part of the socket 61 is connected to binding post 57 by the same member which connects the binding post to part of the socket 60. By this construction and arrangement, whenever the plug or knife switch 62 is fitting into the socket 61, binding posts 57 and 58 will be connected together and also connected with binding post 56 when the knife switch 63 is fitting into its socket, namely, socket 60. The binding posts 54 and 55 will be connected together whenever the knife switch 64 is fitting into its socket, namely, socket 59. Suitable connectors connect the binding posts 54 and 55 with the spark plugs and, therefore, these two binding posts form part of the ignition circuit. The circuit is closed and in proper operative condition whenever the switch 64 is engaging the socket 59 and whenever the switch 64 is disengaged from the socket 59, the ignition system is open and, therefore, the engine 2 could not function. The binding posts 56 and 57 form part of the circuit of the generator and, consequently, said generator cannot supply current until the switch 63 is closed while the switch 62 acts to close the circuit of the starter of the engine 2, said starter having a circuit which includes the binding post 58 and the socket 60. The knife switches 63 and 64 are connected in any suitable manner with the arms 65 and 66, said arms being pivotally supported by the pin 67 and maintained separated by the sleeve 68, pin 67 being riveted or otherwise rigidly secured to a pair of supporting brackets 69 and 70, said brackets being preferably connected together by a bottom plate 71 with which they may be integral if desired, said bottom plate being riveted or otherwise rigidly secured to plate 51. A connecting bar 72 connects the ends of the arms 65 and 66 opposite to that carrying the knives 63 and 64. An abutment or projection 73 is connected to shaft 49 and positioned so that when the shaft is rocked in a proper direction, a sufficient distance, the abutment 73 will press against the bar or pin 72 and depress the same whereupon the switch knives 63 and 64 will be raised so as to be out of contact with the sockets 59 and 60. When the locks 9 are in a locked position and the shaft 20 and head 18 shown in Figure 1 are in their inner positions, the knives 63 and 64 will be maintained raised and, consequently, the generator and the ignition circuit will both remain open.

When the knob 18 and shaft 20 are moved back to for instance, the position shown in Figure 3, the switches 63 and 64 will be closed and also the switch knife 62 will be closed temporarily whereupon the circuit of the starter will be closed and the engine 2 turned over. As indicated in Figures 7 and 8, the switch 62 is connected with a magnetic armature 74 which in turn is riveted or otherwise connected to a nonmagnetic spring 75, which spring is rigidly secured to a support 76 in any desired manner. The spring 75 normally maintains the switch 62 in the position shown in Figure 9 and away from the magnets 77. When the magnets 77 are energized, the knife switch 62 will be closed and held closed until the magnets have been de-energized.

Sometimes, as for instance, when testing certain parts, it may be desired to hold the switch 62 open. When this is the case, the arm 78 is depressed manually. When this takes place, the cam 79 formed thereon (Figure 8) engages the end 80 of lever 81 and depresses the same so that the end 82 will be raised and, consequently, will hold the armature 74 away from the magnets 77.

In Figure 13, a diagram has been shown which illustrates the connection of the various parts and how they co-act to produce the various results above specified. Referring to this figure, 83 indicates the usual storage battery which has one post connected with the wire 84 and the other to the ground. The wire 84 at one end is connected with one of the brushes of the starter 85, the opposite brush being connected through wire 86 to one side of the socket 61, the opposite side being grounded. It will, therefore, be noted that whenever the knife switch 62 is moved downwardly for closing the socket 61, the starter 85 will be supplied with current from the storage battery 83 and, consequently, the engine 2 will be properly turned over. A generator 87 of any desired type is operatively connected with the engine with one side grounded and the other side connected to wire 88, which wire is provided with a branch 89 connected to the windings of magnets 90, which windings are grounded on the opposite side. It will thus be seen that whenever the generator starts to function properly, current will be supplied to the magnets 90 and the armature 74 connected with the knife switch 62 will be actuated for opening the circuit of the starter. The wire 84 is connected through wire 91 to one side of the socket 60 so that when the knife switch 63 is in its closed position caused by the manual actuation of the knob 18, current will flow across the socket 60 through wire 92 and from wire 92 through the magnets 61 to the ground. By this construction and arrangement, it will be seen that as soon as the lock 93 has been unlocked and the knob or rod 20 allowed to move outwardly, current will be immediately supplied to magnets 61 and these magnets will attract armature 74 for closing the circuit of the starter and the starter in turn will turn over the engine 2. The engine in its movement will naturally cause the generator 67 to function and current will then be supplied to magnets 90 for opening the circuit of the starter.

It will also be noted that current is supplied to the ignition coil 94 before the motor is turned over and as long as the switch 63 is closed. Current from the generator will pass from wire 88 through wire 95, circuit breaker 96, wire 97 and from thence either to the battery 63 or to wire 91. Ordinarily the current will pass through wire 91 unless an extra supply is provided whereupon battery 83 will be charged.

In Figures 10, 11, 12 and 14 a modified construction is shown wherein only the additional or modified parts will be described as the operation is very similar to the preferred form. In this form of the invention, the starter is automatically supplied with current for a certain length of time. As indicated in Figure 14, the battery 83' has one post connected directly with the magnets 61' which in turn are connected to a contact plate 98 mounted on a suitable insulating plate 99. A contact arm 100 is connected with a rock shaft 101, which shaft is grounded. Whenever the arm 100 wipes over the contact plate 98, the same will close and maintain the circuit of magnet 61' closed as long as it is in engagement therewith. The structure is so formed that the arm 100 may be moved manually over plate 98 without contacting and then allowed to automatically return in contact. The parts may be set to cause the arm 100 to travel at different speeds so that the circuit of the starter 87' will be maintained closed for a desired time. This circuit may be manually closed by moving the button or pin 102 though ordinarily the automatic closing is sufficient. It will be noted that when the sockets 60 and 61 are closed manually upon the rocking of the shaft 49, current may pass from the storage battery 83' through wire 103 to wire 104 and from thence through the socket 60, wire 105, socket 61 and wire 106 to the starter 87'. In Figures 10 to 12, the arm 100 and associated parts are shown more in detail and from these figures it will be noted that the arm 100 is rigidly secured to the shaft 101, which shaft is urged to the right by a spring 107 as shown in Figures 10 and 12 so that the arm 100 will press against the contact plate 98. In order that this contact may be made only on the return stroke, a cam 108 is provided on the arm 109, which arm is rigidly secured to the shaft 49. As this arm moves to the right as shown in Figure 11 it will urge the end 110 of arm 100 to the right as shown in Figure 12 whereupon the shaft 101 will be tilted slightly so that the arm 100 will be held away from the plate 98 as shown in Figure 10 until it reaches the end 111 of the plate 98. As soon as the contacts move to this position, the arm 109 will quickly return and the arm 100 will also automatically return but much slower, the same being moved back to its former position by any suitable clock work 112 which may include a number of gears, a spring and if desired, a fan. By varying the size and number of gears or varying the size of the fan if the same is used, the speed of the arm may be varied so as to maintain the circuit of the starter 87' closed to a greater or less extent.

In operation, when the parts are in the position shown in Figure 3, the hood 3 is locked down and the ignition circuit, as well as the circuit of the starter, is opened. The lock structure 93, which may be of any desired kind, as for instance, that disclosed in my copending application, is provided with a locking bolt 113 which is held in place by suitable tumblers. The lower end of this bolt projects into a cavity 114 in the sleeve member 19 and is locked in this position so that the spring 44 cannot force the cam member 115 forwardly. However, when the lock 93 is moved to an unlocked position, the spring 44 will quickly move the rod 20 and associated parts including the cam member 115, which cam member is pivotally mounted at 116 and is provided with a hook-shaped lug 117, which lug is automatically caused to move downwardly as the sleeve 19 is moved longitudinally by spring 44. This downward movement will cause the forward end 118 to tilt upwardly and assist in raising the bolt 113. It will thus be seen that as soon as the locking mechanism of lock 93 is moved to an unlocked position, rod 20 and associated parts will be quickly moved outwardly or to an operated position and as this is done, the locking structure shown in Figure 5 will be unlocked, the circuit of the starter will be closed and also the circuit of the ignition system will be closed. It will thus be seen that as soon as the bolt 113 is permitted to rise, the engine is not only unlocked but is turned over and the proper electrical circuits closed to temporarily cause an operation of the starter and to cause a permanent closing of the ignition circuit.

What I claim is:

In a safety device for automobiles comprising a generator circuit, a starter circuit, a magnetic means and a generator included in the generator circuit, a third circuit including a second magnetic means, an armature located between the first and second magnetic means, a switch element connected with the armature, a second switch element adapted to be engaged by the first mentioned switch element and connected with the starter circuit, a manually operable switch incorporated in the third circuit for closing said circuit for causing energization of the second magnetic means, a source of current connected with the starter circuit and the second magnetic means, the second magnetic means adapted to actuate the armature for moving the switch elements together and for closing the starter circuit when the manually operable switch is closed until the generator circuit supplies sufficient current to energize the first magnetic means in the generator circuit for moving the armature and likewise the switch elements of the starter circuit away from each other.

JOHN P. GERAGHTY.